2 Sheets—Sheet 1.

W. BUTTERFIELD.

Sewing Machine.

No. 1,600.

Reissued Jan'y 5, 1864.

Witnesses,
Francis Gould
Walter H Bunny

2 Sheets—Sheet 2.

W. BUTTERFIELD.

Sewing Machine.

No. 1,600.

Reissued Jan'y 5, 1864.

Witnesses:
Francis Gould
Walter H. Ewing

N. PETERS, Photo-Lithographer, Washington, D.C.

UNITED STATES PATENT OFFICE.

ELMER TOWNSEND, OF BOSTON, MASS., ASSIGNEE OF WM. BUTTERFIELD.

IMPROVEMENT IN SEWING-MACHINES.

Specification forming part of Letters Patent No. 11,240, dated July 4, 1854; Reissue No. 1,600, dated January 5, 1864.

*To all whom it may concern:*

Be it known that WILLIAM BUTTERFIELD, formerly of Boston, in the county of Suffolk, in the State of Massachusetts, but now of Roxbury, in the county of Norfolk, in the said State, did invent certain new and useful Improvements in Machines for Sewing; and I do hereby declare that the following specification and its accompanying drawings, taken in connection with the references thereupon marked, is a sufficient description of the invention to enable those skilled in the art to practice it.

Figure 4:
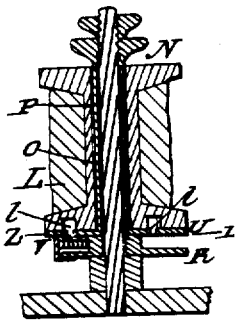
Figure 5:
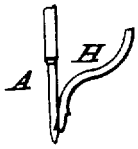
Figure 6:
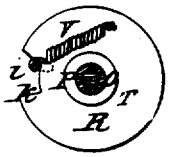
Figure 1:
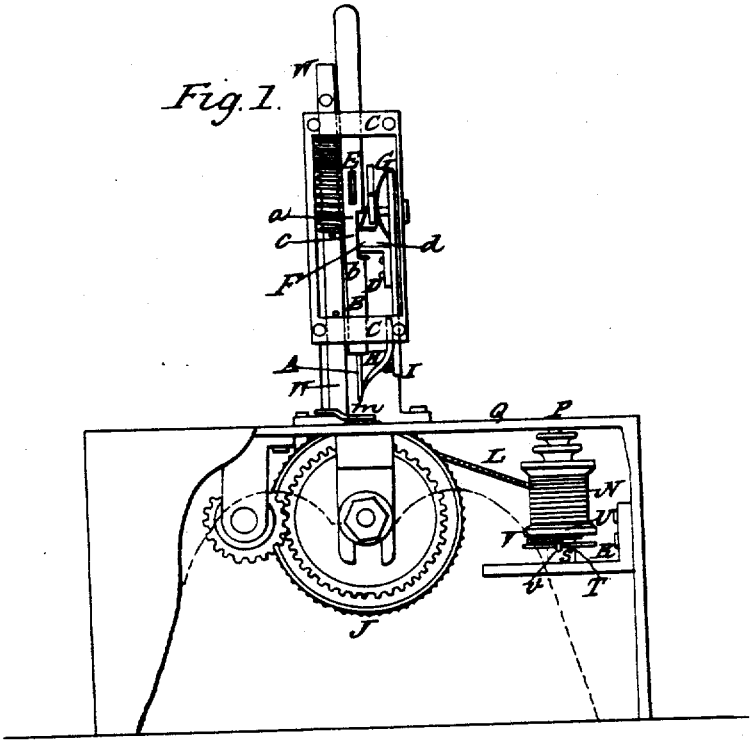
Figure 2:
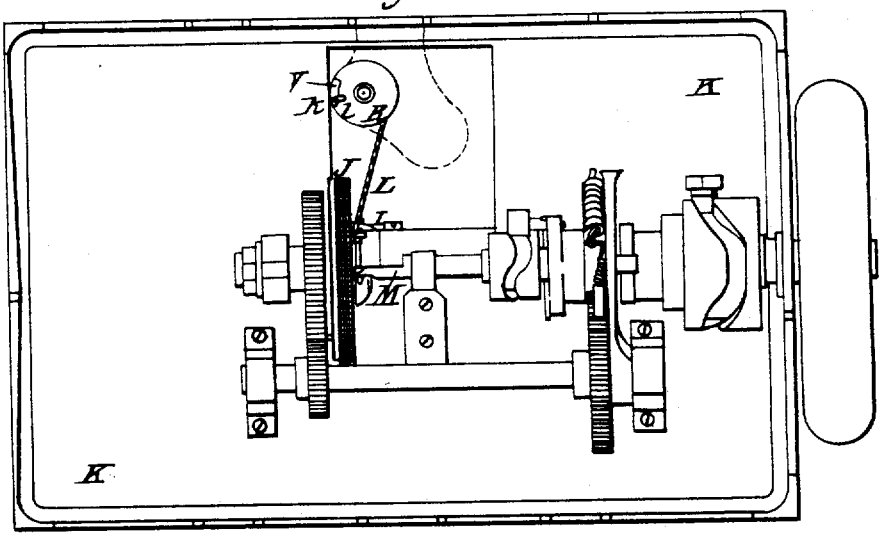
Figure 3:
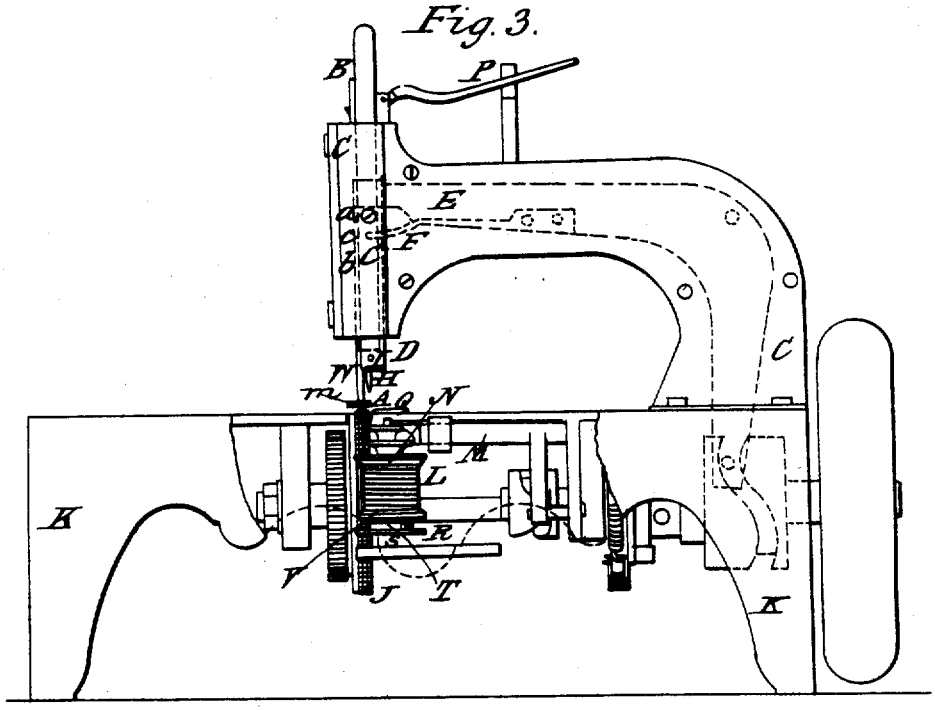

Of said drawings, Figure 1 denotes a front view of a machine embodying this invention; Fig. 2, an under side view, and Fig. 3 a side elevation, of the same. In Figs. 1 and 3 parts of the frame or bed K of the machine are represented as broken away in order more clearly to exhibit the operative mechanism. Fig. 4 represents, of a size suitable for practical use, a vertical section through a mechanism which combines a bobbin, a bobbin-holder, a tension-producing device, and a take-up device. Fig. 5 is a detailed view of the crochet or hook needle and its attendant "rest cast-off," both being shown of a size suitable for practical operation in sewing heavy leather. Fig. 6 is a section taken in line *z z*, (seen in Fig. 4.) and showing the disk R in plan.

This invention relates to such machines as employ what is known as a "crochet" or "hooked" needle, and as are generally, though not exclusively, used to sew with a waxed thread; and it may be classed as an improvement upon the machine patented in the United States as No. 7,622, to Philip May, and also on the machine patented, as aforesaid, to William Wickersham, April 19, 1853, and numbered 9,679.

This invention consists in the distinctive character and operation of the rest cast-off, as compared with the device described in said Patent No. 7,622 as the "tube or holder," and as compared also with the device described in said Patent No. 9,679 as the "slide," and in the mechanism by which the rest cast-off is operated, and in the combinations which it forms with other members of the sewing mechanism, whereby the function of sewing is better performed than ever before with a machine employing the hook or crochet needle; also, in the peculiar arrangement shown by which bobbins may be changed without disturbing the take-up spring.

The common device of a lever, E, operated in the customary way, reciprocates the bar B, in which the needle A is fixed, and within the bed K suitable and well-known mechanism, fully shown in the drawings, operates the feeding device, which in this case is shown as the serrated wheel J, protruding through the work-supporting surface Q of the bed, and also operates the well-known "thread-carrier" M, for its usual function of carrying the thread, or so placing it in position relative to the throat of the needle, when this is thrust through the material to be sewed, that the thread will be caught in the ascent of the needle in its hook, and will be drawn up thereby in the form of a loop or bight. The goose-neck C, besides acting to guide the needle-bar, also guides the bar W of the presser-foot *m* and the bar D of the rest cast-off H. In that side of the needle-bar B nearest the rest cast-off bar D there is formed a notch or recess, defined by its top *a*, its bottom *b*, and its side *c*. There is fixed by one end to the needle-lever E a spring, F, which has its free end projecting into the aforesaid notch or recess in B. Said spring, when moving downward with E, comes into contact with a projection marked *d*, which is secured to the rest cast-off bar D, and which also projects into the said notch in the needle-bar, the spring F forming the means for moving the rest cast-off bar downward, and it is moved upward by the impingement of the end *b* of the notch against the lower surface of the projection *d* during the ascent of the needle-bar.

To prevent the rest cast-off bar from moving, except under the action of contact with the spring F or the part *b* of the needle-bar, a spring, G, is so arranged as to press against the rest cast-off bar with a force sufficient to hold it in any position against its gravitating tendency, and against any tendency to move caused by the jar of the movement of the machine, or by any accidental friction of the parts. The lower end of the rest cast-off bar carries the rest cast-off H, which may be made as a spring having a tendency to spring away from the needle; but by the set-screw I in the end of the cast-off bar D the rest cast-off is kept and adjusted so as to suit any practical diameter of needle, the lower end of the

BEST AVAILABLE COPY cast-off operating as a shield in front of the needle or on its hook side, and as a presser-foot to keep the stock down upon the supporting-surface when the needle is drawing out of the work, bringing with it a bight or loop of thread.

The operation of this part of the invention is as follows: The spring F is so located when the rest cast-off has been brought by the contact of the end *b* of the notch in the needle-bar with the projection *d* from the cast-off bar to the highest position which the cast-off ever attains, the needle being at its greatest elevation, that said spring F shall not be in contact with the projection *d* from the cast-off bar. When the needle then commences to move downward it will be seen that the cast-off remains stationary till the spring F impinges upon projection *d*, the effect of which lack of motion on the part of the cast-off is to allow the needle to move downward unaccompanied by the cast-off, and thus its throat or mouth is uncovered from the cast-off and in condition to discharge therefrom the loop or bight of thread therein contained, and this discharge is effected as follows: At or before the time when the throat of the needle is uncovered from the cast-off the work has been fed along the distance of the length of one stitch away from the throat of the needle toward its back, and away from the cast-off, so that the loop of thread no longer is perpendicular from the needle to the work, but has a slight inclination away from the cast-off, which is further increased as the needle still descends (it leaving the loop standing in its inclined position) by the action of the upper inclined part of the throat of the needle against the bight of the thread, so that the loop falls out of the eye or throat of the needle in a direction contrary to that in which the work is moved by the feed, and tending to describe the arc of a circle from the spot where it emerges from the work. Then as the needle continues to move downward the cast-off moves with it by reason of contact of spring F with projection *d*, the movement being at the same rate of speed with the needle and the point of the cast-off, preserving its position relative to the needle till the cast-off strikes upon the surface of the work, where it rests by reason of the flexure of spring F, which takes place during the remainder of that vibration of lever E which carries the needle downward, and because of this resting action upon the goods H is termed the "rest cast-off," and it may here be stated that the spring F should be so fixed upon the lever E with reference to projection *d* as to carry the end of the cast-off into contact with the thinnest goods, at least by the time the needle arrives at the termination of its downstroke. Now, when the needle begins to ascend the cast-off does not move upward at once with it, but remains pressed by spring F upon the work in front of the needle till after it emerges above the work, bringing with it a newly-formed loop of thread, which it draws through the previously-formed loop, now surrounding the body of the needle and the cast-off. This upward movement of the needle causes the previously-formed loop to be drawn closely around the needle and the cast-off, and were it not for the interposition of the cast-off between the needle and this loop said loop would be caught in the eyed opening of the needle and on its barb as soon as these emerged above the work. The needle in drawing the new loop of thread through the work tends to lift the work from the supporting-surface, which tendency is resisted by the cast-off with the whole force with which the spring F is flexed, and this resistance helps to keep the barb of the needle from cutting the goods or becoming entangled with them.

It should here be mentioned that the end *b* of the notch in the needle-bar should be so adjusted with reference to the lower side of projection *d* that the cast-off will not be lifted from the surface of the thickest goods which the machine is designed to sew till after the barb has emerged above the surface of the goods at least the distance of the diameter of the thread employed in sewing. When the bottom *b* of the notch in the needle-bar comes into contact with the lower side of the projection *d* the cast-off rises with the needle till both at the same time attain their highest position, when the operations consequent upon the descent of the needle will be repeated.

Unlike the slide used in connection with the aforesaid Patent No. 9,679, the rest cast-off does not accompany the needle in its passage through the goods, nor does it receive the pressure from the loop previously drawn up and surrounding the needle upon its overhanging or unsupported end, but is supported at one end by the bar to which it is attached, and at the other upon the goods, and by bearing against the outside of the needle. The said "slide" gave in use much trouble and expense by bending into the throat of the needle, or else by breaking there, and the needle itself was weakened by the groove therein made for the slide, and the groove and slide also gave much trouble by clogging, with the gumming of oil, with dust, and with wax, all of which troubles this invention avoids, and is in that respect an improvement over the slide in the patent referred to, besides having a function which said slide was without.

In the patent referred to as No. 7,622 the tube or holder therein described has embodied therein imperfectly some of the functions of both the rest cast-off and the presser-foot; but it was faulty in its action as a presser-foot, because at the last moment of the ascent of the needle, when the presser function should most strongly resist the raising of the goods from the supporting-surface, and thus render it certain that the previous stitch would be drawn up tightly, the tube or holder was suddenly elevated to about the height of the ascent of the needle, and the goods were left unconfined on the supporting-surface, except as held by the manipulation of the operator. As a means for preventing the entanglement of the thread in the opening and on the barb of the needle, the said tube or holder was also faulty, because, first, as its name implies, it surrounded the needle, and therefore left a comparatively large bight to be drawn up by the last ascending portion of the movement of the needle, and as there was little movement of the needle after the tube or holder left the surface of the goods to move upward this increased the faulty drawing in of the stitches, consequent on the deficiency of the presser function to an extent which has prevented public use of machines made in accordance with the specification of said Patent No. 7,622. The tubular formation of the tube or holder also rendered the catching of the previously-formed loop between the surface of the goods and the edge of the tube or holder a matter of inconvenient frequency, occasioning fraying of the thread or its breakage. The absence of an automatic feed to give the thread the proper inclination to the needle at the proper time to assist in discharging the thread from the eye of the needle caused the thread often to remain in the eye of the needle till the tube or holder descended on the needle and closed the eye or became jammed on the thread, either of these disarrangements being a matter of frequency and stopping the operation of the machine. And, further, as touching the holding function of this rest cast off, it is an improvement over the tube or holder in its adaptation to holding down the goods in front of the needle, where sewing has to be performed in grooves or very narrow channels, because by dispensing with the tubular formation it is possible to sew in narrower channels than with the tubular formation, and this construction of the cast-off is cheaper in cost and more universally applicable to needles of different sizes than is the tubular holder.

From a bobbin, N, located beneath the bed the thread proceeds to and through a hole in the carrier M in the usual manner. The said bobbin is placed on a tubular axle, O, that turns upon a fixed or stationary axle, P, and has a friction-disk, R, on its lower end, such friction-disk being made to rest on a shoulder, S, of the fixed axle. A shoulder, T, is arranged on and near the lower part of the tubular axle, and on this shoulder a movable bobbin-holder, U, is placed, it being made to turn freely on the tubular axle and to be connected with the disk R by a spring, V, which is attached at one end to a stud or pin, *i*, that projects down from the bobbin-holder U and into a notch, K, made in the disk R, as seen in Fig. 6. The holder U is provided with one or more studs or pins, *l*, which extend upward from it and into a corresponding recess or recesses formed in the lower head of the bobbin. By means of this holder a full bobbin may at any time be substituted for an empty one; but as before constructed, the bobbin being directly connected to the disk R by the take-up spring V, only one bobbin could be employed. Removing it and supplying it with fresh thread consumed too much valuable time. By means of this part of the invention an empty bobbin may be removed and a full one substituted for it without disturbing the take-up spring V and saving the time of the operator.

The presser-foot *m* is held constantly upon the goods by means of the spring *n*, surrounding the presser-foot bar W, said spring permitting sufficient vertical play to the presser-foot to accommodate goods of different thicknesses, and inequalities in the thickness of any material to be sewed. This presser serves to aid the pressure exerted by the rest cast-off, and alone forms the resistance against which the upward pull of the needle tightens the previously-formed stitch, and when the needle is above the goods forms the only means by which they are secured to the supporting-surface and are rendered subject to the action of the feeding device. By depressing the lever *p* the cam formation on its short end raises the presser-foot compressing spring *n*, so that goods may be easily placed upon or removed from the machine.

What is claimed is—

1. Separating into two instruments (a presser-foot and a rest cast-off, both operating on the surface of the material to be sewed) the tube or holder hereinbefore referred to, so that the rest cast-off can act independently of the presser-foot as respects its times and extent of motion, substantially in the manner specified.

2. Constructing the rest cast-off of such a form that it operates and is located in front of the barb of the needle, instead of surrounding it, by which construction it operates in an improved manner, especially when sewing in narrow channels.

3. Making the rest cast-off adjustable with reference to the needle, substantially as described.

4. The combination of a supporting-surface, crochet-needle, and presser-foot with a rest cast-off operating substantially as described.

5. The combination of a supporting-surface, crochet-needle, and feeding device with a rest cast-off, operating substantially as described.

6. The improvement by which the rest cast-off is rendered capable of adapting itself to any ordinary thickness or variation of thickness of the fabric or article to be sewed, such improvement consisting in the above-described mode of operating it by the spring F, applied to the carrier-lever E, and made to operate on the lower end of the recess C, as stated.

7. The combination of the bobbin-holder U with the spring V, the friction-disk R, and the axle on which the holder turns, the same enabling an empty bobbin to be removed from the holder and a full one put in its place without disturbing the connection of the spring with the bobbin and friction plate or disk.

ELMER TOWNSEND.

Witnesses:

FRANCIS GOULD,
WALTER H. COWING.